(12) United States Patent
Gretz

(10) Patent No.: US 7,847,190 B1
(45) Date of Patent: Dec. 7, 2010

(54) REVERSIBLE PROTECTIVE CABLE CHUTE FOR ROUTING LOW VOLTAGE CABLES THROUGH WALLS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 288 days.

(21) Appl. No.: 12/290,374

(22) Filed: Oct. 30, 2008

Related U.S. Application Data

(63) Continuation-in-part of application No. 12/082,030, filed on Apr. 8, 2008, which is a continuation-in-part of application No. 12/075,326, filed on Mar. 11, 2008, and a continuation-in-part of application No. 12/011,162, filed on Jan. 24, 2008, now Pat. No. 7,563,979.

(51) Int. Cl.
*H02G 3/14* (2006.01)
(52) U.S. Cl. .............................. 174/66; 174/67; 174/53; 220/241
(58) Field of Classification Search ................... 174/53, 174/58, 63, 64, 66, 67; 220/241, 242; 439/76.1, 439/131, 135, 144; 248/56; D8/350–353
See application file for complete search history.

(56) References Cited

U.S. PATENT DOCUMENTS

| | | | |
|---|---|---|---|
| 4,688,747 A | 8/1987 | Helmsdorfer et al. | |
| 6,064,003 A | 5/2000 | Moore et al. | |
| 6,793,524 B2 | 9/2004 | Clark et al. | |
| D503,156 S | 3/2005 | Provenzano | |
| D554,475 S | 11/2007 | Gorin et al. | |
| 7,390,964 B2 | 6/2008 | Gorin et al. | |
| 7,399,920 B2 * | 7/2008 | Gorin et al. | 174/66 |
| 7,654,405 B2 * | 2/2010 | Provenzano et al. | 220/241 |
| 2008/0110886 A1 | 5/2008 | Provenzano et al. | |

\* cited by examiner

*Primary Examiner*—Dhiru R Patel

(57) ABSTRACT

A reversible protective cable chute for attachment to a horizontal electrical box or low voltage frame to enable the routing of low voltage cables there through. A first embodiment of the reversible protective cable chute includes a cable shield that is used in conjunction with a conventional decorative cover plate and a second embodiment includes a cover integral with the cable shield. In the first embodiment, the cable shield includes two ears with apertures therein for mounting directly to a conventional single gang electrical box or conventional low voltage frame. Bores are provided in the ears of the protective cable shield for receipt of fasteners for mounting a standard decorative plate thereto. A second embodiment of the reversible protective cable chute includes a cover integral with the cable shield for direct mounting to an electrical box or low voltage frame.

10 Claims, 9 Drawing Sheets

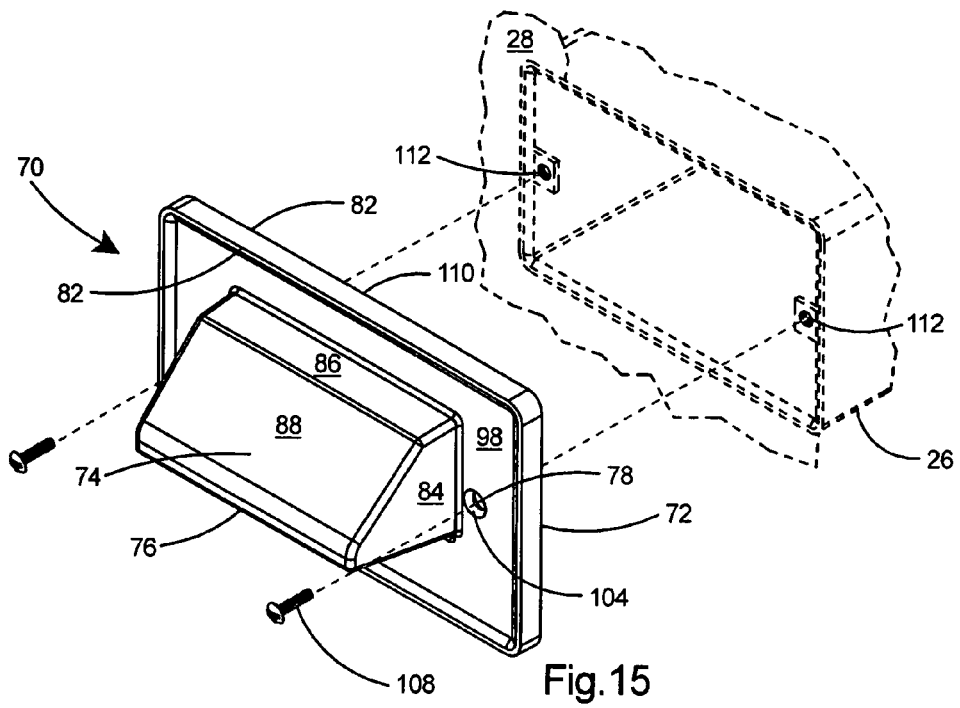
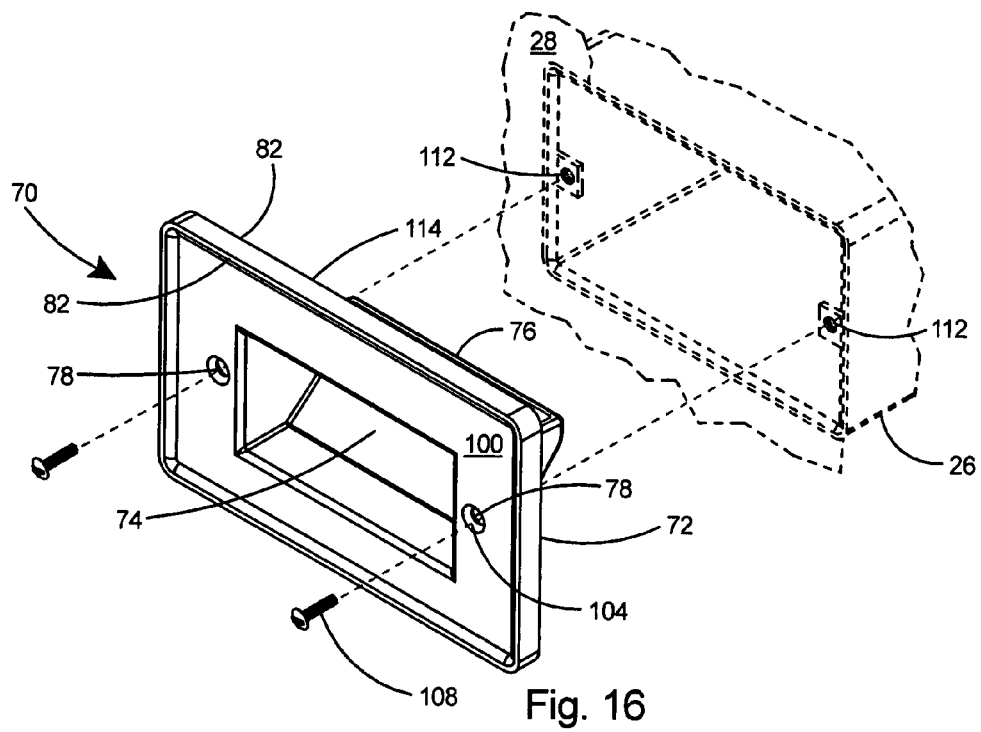

REVERSIBLE PROTECTIVE CABLE CHUTE FOR ROUTING LOW VOLTAGE CABLES THROUGH WALLS

This application is a Continuation-In-Part of U.S. patent application Ser. No. 12/082,030 filed Apr. 8, 2008 and still pending, which is a Continuation-In-Part of U.S. patent application Ser. No. 12/075,326 filed Mar. 11, 2008 and still pending, and is a Continuation-In-Part of U.S. patent application Ser. No. 12/011,162 filed Jan. 24, 2008 now U.S. Pat. No. 7,563,979 and still pending, all of which are commonly owned by the assignee of the present invention and the entire contents of which are incorporated herein by reference.

FIELD OF THE INVENTION

This invention relates to the installation of low voltage wiring in buildings and specifically to a reversible protective cable chute for routing low voltage electrical or communications cables from one room to an adjacent room through interior walls.

BACKGROUND OF THE INVENTION

A wide variety of low voltage components such as telephone cables, coax cables for television and internet service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

In some cases, holes are simply made in the baseboard or walls and low voltage cables are simply routed through the holes. However, this is an unsightly solution and detracts from the overall appearance of the building. One prior art device for routing low voltage components is that of U.S. Pat. No. 4,688,747 to Helmsdorfer, et al., issued on Aug. 25, 1987, which includes a wall aperture molding with a removable plate cover. The plate cover clips to the molding plate with the plate cover extending downwardly and outwardly from the molding plate to define a cable passage between the lower edge of the plate cover and the molding plate. The molding plate may be further provided with a gate slot to provide installation over pre-existing cables.

However, one disadvantage with prior art wall aperture moldings such as that described above is that they are not complementary with wall openings prepared for conventional electrical devices. Therefore, in order to install the prior art molding plate, a hole must be made specifically sized for the molding plate. A further disadvantage with the aperture molding described above is that it is limited to one orientation with respect to the molding plate, which orientation includes the plate cover extending outward from the plate and wall. There is no arrangement for mounting the plate cover such that it extends into the wall.

Although the parent patent application Ser. Nos. 12/011,162, 12/075,326, and 12/082,030 provided several protective cable chutes for routing low voltage wires through interior walls, the cable chutes were for use with an electrical box or low voltage frame mounted in the standard vertical orientation. Frequently the electrical box or low voltage frame is mounted on a wall in a horizontal orientation. The current invention therefore provides two embodiments of a reversible protective cable chute for use with a horizontally mounted electrical box or low voltage frame. The reversible protective cable chute may be used with conventional electrical boxes or conventional low voltage frames for the purpose of providing an aesthetically attractive portal for routing low voltage cables through walls.

SUMMARY OF THE INVENTION

The invention is a reversible protective cable chute that can be mounted to a horizontal electrical box or low voltage frame to enable routing low voltage cables there through. A first embodiment of the reversible protective cable chute includes a cable shield that is used in conjunction with a conventional decorative cover plate and a second embodiment includes a cover integral with the cable shield. In the first embodiment, the cable shield includes two ears with apertures therein for mounting directly to a conventional single gang electrical box or conventional low voltage frame. Threaded bores are provided in the ears of the protective cable shield for receipt of fasteners for mounting a standard decorative plate thereto. A second embodiment of the reversible protective cable chute includes a cable shield and integral cover that are mounted to an electrical box or low voltage frame to provide an opening and passageway for receiving low voltage cables for the purpose of routing them through the wall and into an adjacent room.

OBJECTS AND ADVANTAGES

Several advantages are achieved with the reversible protective cable chute of the present invention, including:

(1) The reversible protective cable chute provides a device for routing low voltage wires and cables through walls.
(2) The protective cable chute provides an aesthetically attractive portal for wires and cables passing through walls.
(3) A first embodiment of the protective cable chute for a single gang electrical box may be used with conventional decorative cover plates and therefore does not require the manufacture of a specially designed cover plate.
(4) The protective cable chute may be used with horizontally mounted electrical boxes or low voltage frames.
(5) Several configurations are available to the installer to provide several options for an attractive installation. The reversible protective cable chute can be mounted with the cable shield extending outward or inward and with the nose portion opening oriented upward or downward, thereby allowing selection of one of four possible mounting installations for added flexibility in routing cables through walls.
(6) By using the protective cable chute of the present invention, the installer may be able to utilize existing installed electrical boxes and low voltage frames for routing low voltage cables and thereby avoid creating additional holes in the walls.

These and other objects and advantages of the present invention will be better understood by reading the following description along with reference to the drawings.

DESCRIPTION OF THE DRAWINGS

FIG. 15 is a perspective view of the second embodiment of the reversible protective cable chute secured to a wall in a first orientation with the cable chute oriented outward and down.

FIG. 16 is a perspective view of the second embodiment of the reversible protective cable chute secured to a wall in a second orientation with the cable chute oriented inward and up.

INDEX TO REFERENCE NUMERALS IN DRAWINGS

Figure 1:
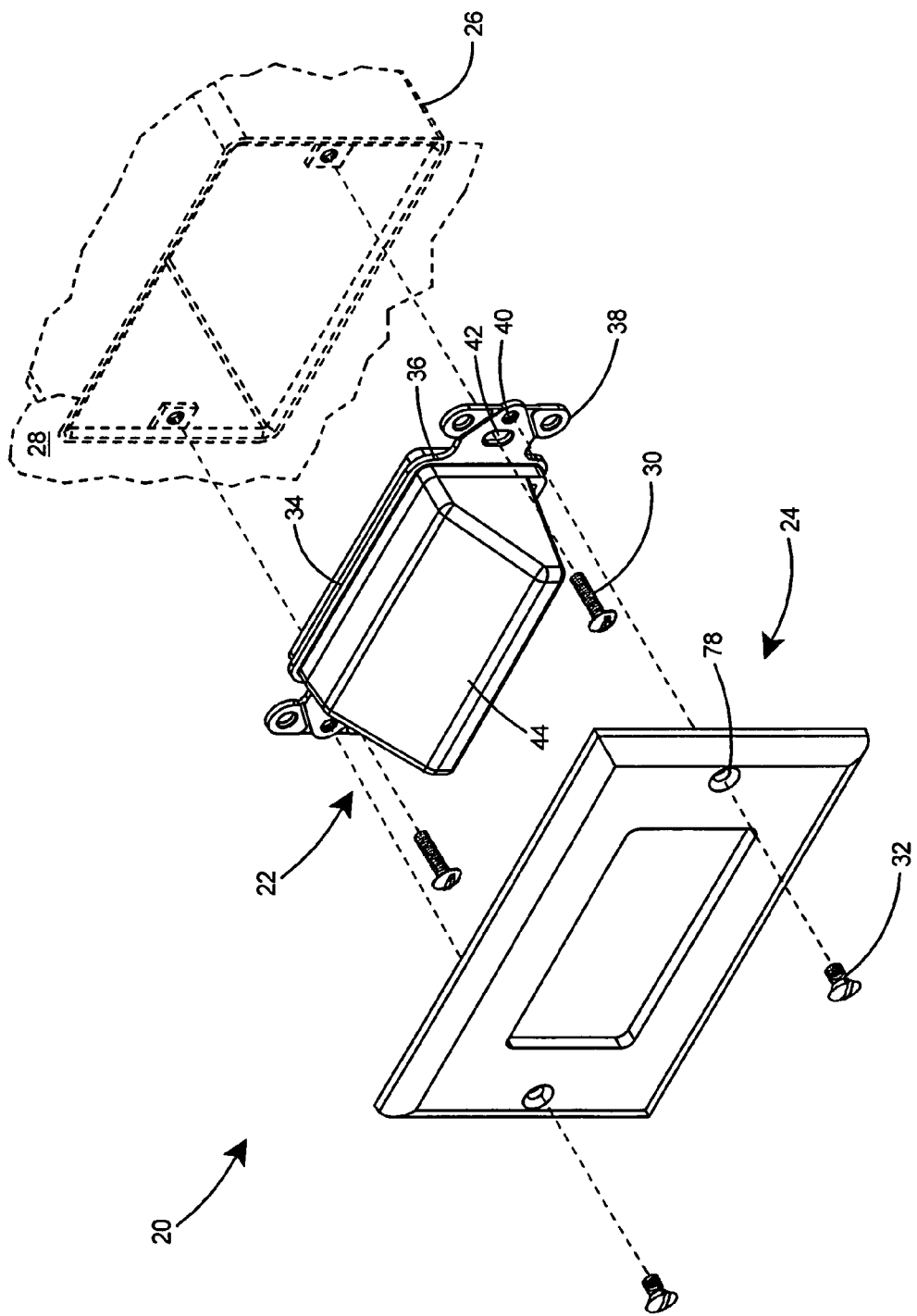
FIG. 1 is an exploded perspective view of a first and preferred embodiment of a reversible protective cable chute according to the present invention.

| | |
|---|---|
| 20 | reversible protective cable chute, first embodiment |
| 22 | cable shield |
| 24 | cover plate |
| 26 | electrical box |
| 28 | wall |
| 30 | cable shield fastener |
| 32 | cover fastener |
| 34 | base portion of cable shield |
| 36 | end of cable shield |
| 38 | ear |
| 40 | outer bore |
| 42 | inner bore |
| 44 | nose portion |
| 46 | sidewall |
| 48 | top wall |
| 50 | outer wall |
| 52 | planar outer edge |
| 54 | planar side edge |
| 56 | rectangular-shaped nose portion opening |
| 58 | peripheral collar |
| 60 | open area |
| 62 | rear opening |
| 64 | cable passageway |
| 66 | lower portion of nose |
| 70 | reversible protective cable chute, second embodiment |
| 72 | cover plate |
| 74 | cable shield |
| 76 | nose portion |
| 78 | two-way aperture in cover plate |
| 80 | fastener |
| 82 | raised outer periphery of cover plate |
| 84 | side wall |
| 86 | top wall |
| 88 | outer wall |
| 90 | end wall |

-continued

INDEX TO REFERENCE NUMERALS IN DRAWINGS

| | |
|---|---|
| 92 | outer edge |
| 94 | side edge |
| 96 | bottom edge of cover plate opening |
| 98 | front recessed area |
| 100 | rear recessed area |
| 101 | axis perpendicular to front surface of cover plate |
| 102 | axial center of cover plate aperture |
| 104 | countersunk area |
| 106 | center of cover plate aperture |
| 108 | fastener |
| 110 | rear surface of cable chute |
| 112 | bore in electrical box |
| 114 | front surface of cable chute |
| D1 | distance nose portion extends from base portion |
| D2 | depth of front opening |
| H1 | height of front opening |
| W1 | width of front opening |
| W2 | width at center of cover plate aperture |
| Θ1 | angle of lower edge of nose portion with respect to horizontal |
| Θ2 | angle of countersunk area around cover plate aperture |
| Θ3 | angle of side walls of cable shield with respect to cover plate |

DETAILED DESCRIPTION OF THE INVENTION

Referring to FIG. 1 there is shown a first embodiment of the present invention, a reversible protective cable chute 20 including a cable shield 22 and a conventional decorative cover plate 24. The reversible protective cable chute 20 is depicted in alignment with a horizontally mounted electrical box 26 secured in a wall 28. Cable shield fasteners 30 secure the cable shield 22 to the electrical box and cover fasteners 32 secure the cover plate 24 to the cable shield 22.

Figure 2:
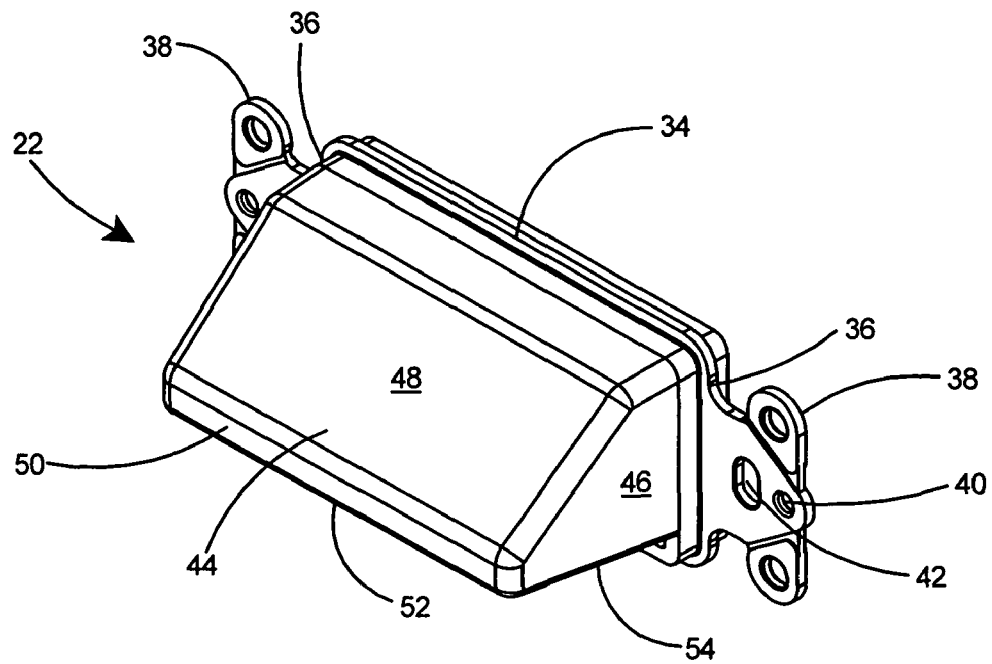
FIG. 2 is a front perspective view of a cable shield that forms a portion of the reversible protective cable chute of FIG. 1.
Figure 3:
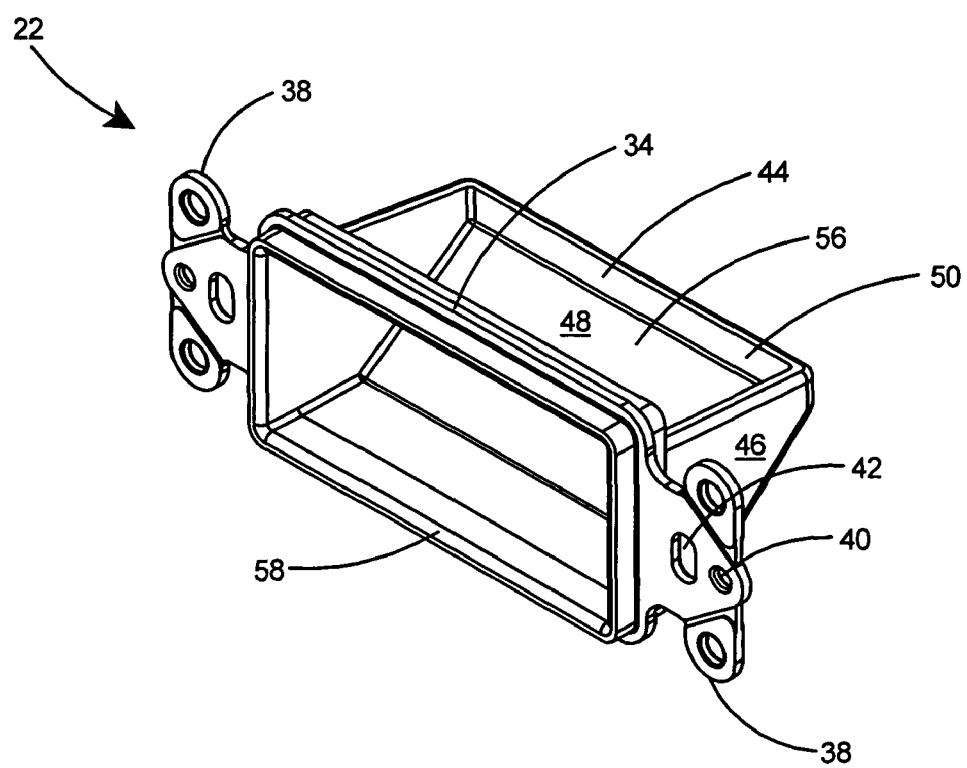
FIG. 3 is a rear perspective view of the cable shield of FIG. 2.

As shown in FIGS. 2 and 3, the cable shield 22 includes a base portion 34 having two ends 36 and two ears 38 extending from each end 36. Outer bores 40 and inner bores 42 are provided in the ears 38. The cable shield 22 further includes a nose portion 44 having sidewalls 46, a top wall 48, and an outer wall 50. A planar outer edge 52 is provided on the outer wall 50 and a planar side edge 54 is provided at the lower end of the sidewalls 46. As shown in FIG. 3, a substantially rectangular-shaped nose portion opening 56 is formed by the outer edge 52 and side edge 54 of the outer wall 50 and sidewalls 46 respectively rectangular-shaped nose portion opening 56 is formed by the outer edge 52 and side edge 54 of the outer wall 50 and sidewalls 46 respectively. A peripheral collar 58 extends outward from the base portion 34 in the opposite direction of the nose portion 44.

Figure 4:
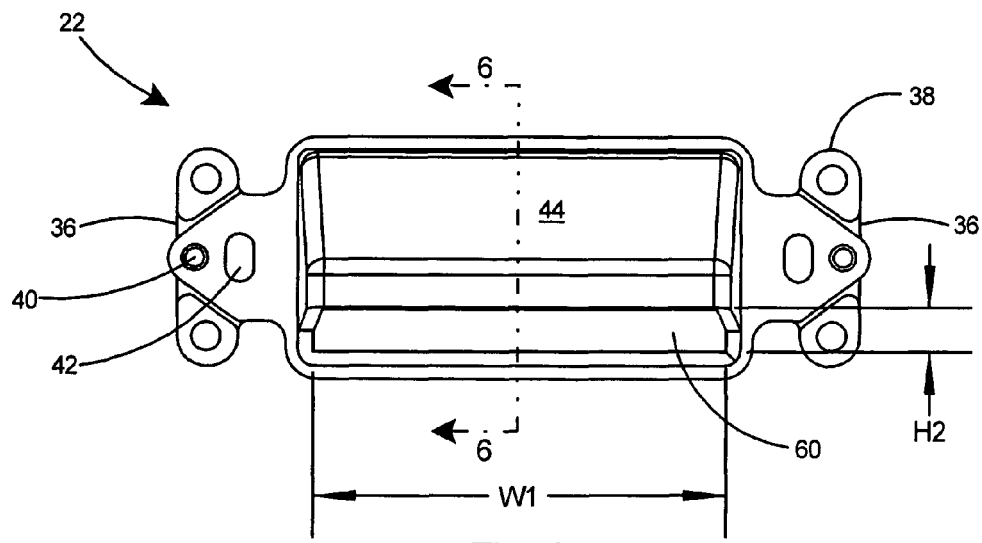
FIG. 4 is a front view of the cable shield of FIG. 2.
Figure 5:
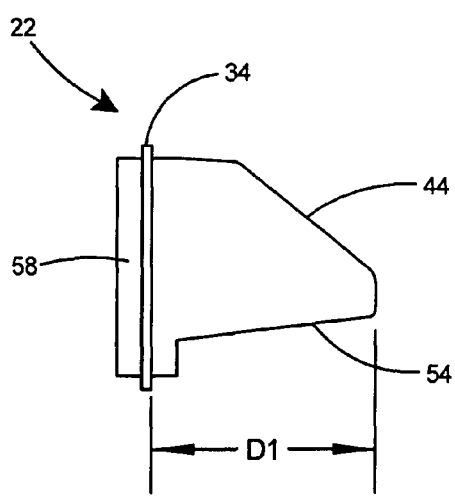
FIG. 5 is a side view of the cable shield of FIG. 2.
Figure 6:
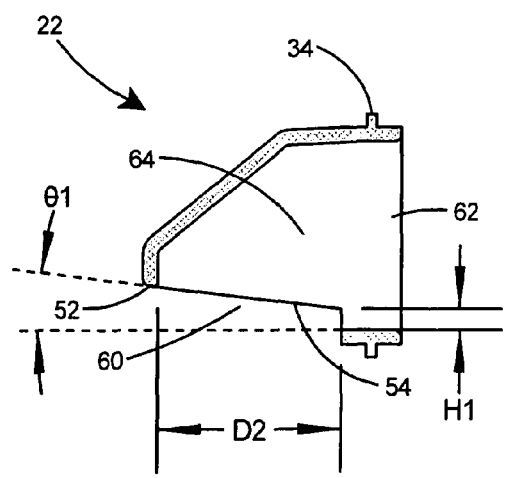
FIG. 6 is a sectional view of the cable shield taken along line 6-6 of FIG. 4.

Referring to FIGS. 4-6, the cable shield 22 further includes a substantially wide open area 60 with width W1 that is visible from the front of the cable shield 22. As shown in FIG. 5 the nose portion 44 extends a substantial distance D1 from the base portion 34 thereby creating a substantially deep open area 60 with depth D2. The cable shield 22 includes a rear opening 62 and an open cable passageway 64 extending between the open area 60 and rear opening 62. As shown in FIG. 6, the angle Θ1 of the outer edge 52 of the nose portion 44 with respect to horizontal combined with the height H1 of the side edge 54 above the lower portion 66 of the nose 44 creates an open area 60 that is readily visible from the front of the nose portion 44. As shown in FIG. 4, the open area 60 is of width W1 and height H2. Angle Θ1 of the outer edge 52 of the nose portion 44 with respect to horizontal is preferably between 5 and 9 degrees.

Figure 7:
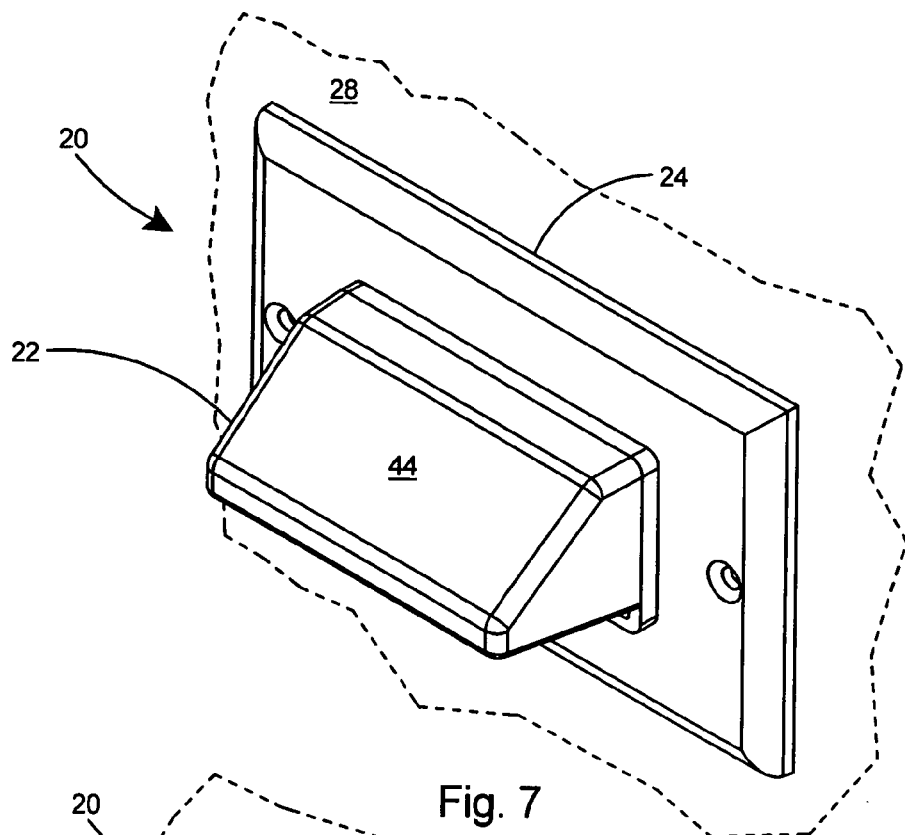
FIG. 7 is a perspective view of the first embodiment of the reversible protective cable chute secured to a wall in a first orientation with the cable chute oriented outward and down.
Figure 8:
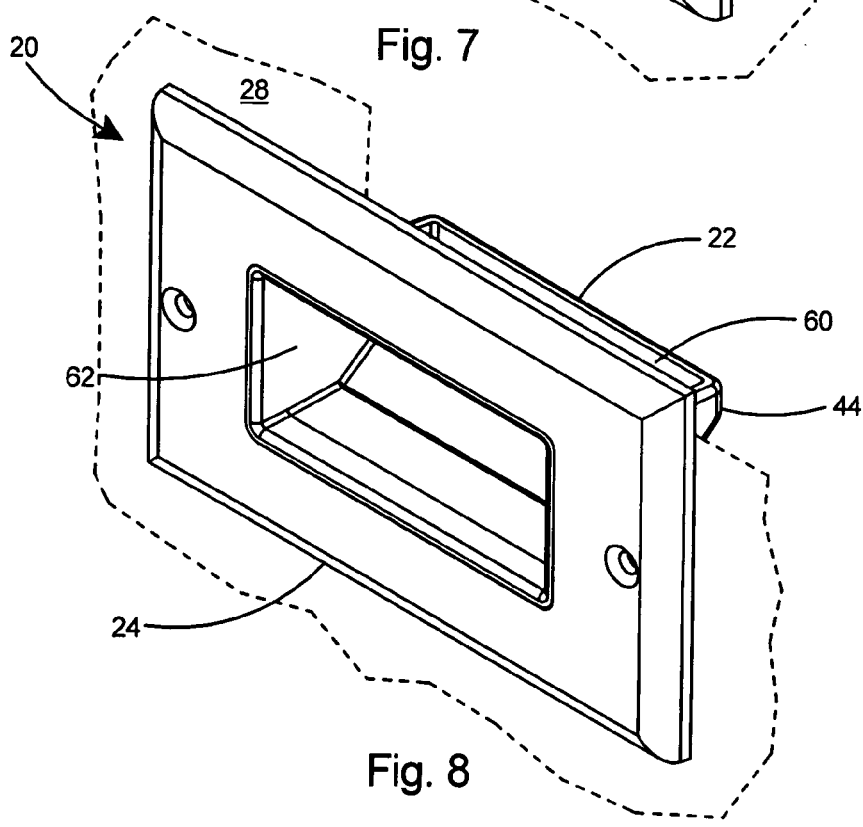
FIG. 8 is a perspective view of the first embodiment of the reversible protective cable chute secured to a wall in a second orientation with the cable chute oriented inward and up.

With reference to FIGS. 7 and 8, the first embodiment of the reversible protective cable chute 20 may be secured to a wall in several orientations, with the cable shield 22 being reversed with respect to the electrical box or low voltage frame (not shown) to meet the installer's requirements. The cable shield 22 can be installed with the nose portion 44 extending away from the box, as shown in FIG. 7. In this configuration low voltage cables may be routed upward into the open area 60 and through the wall 28.

An alternative configuration for the first embodiment of the reversible protective cable chute 20 is depicted in FIG. 8. In this configuration, the cable shield 22 is secured to secured to an electrical box or frame member (not shown) with the nose portion 44 extending into the box or frame member and therefore into the wall 28. The cover plate 24 is then secured to the cable shield 22 to complete the installation. In this configuration low voltage cables may be routed into the rear opening 62 and through the wall 28. The configuration depicted in FIG. 8 may be used in those situations in which space is at a premium and it would be undesirable to have the nose portion 44 extending into the room.

Figure 9:
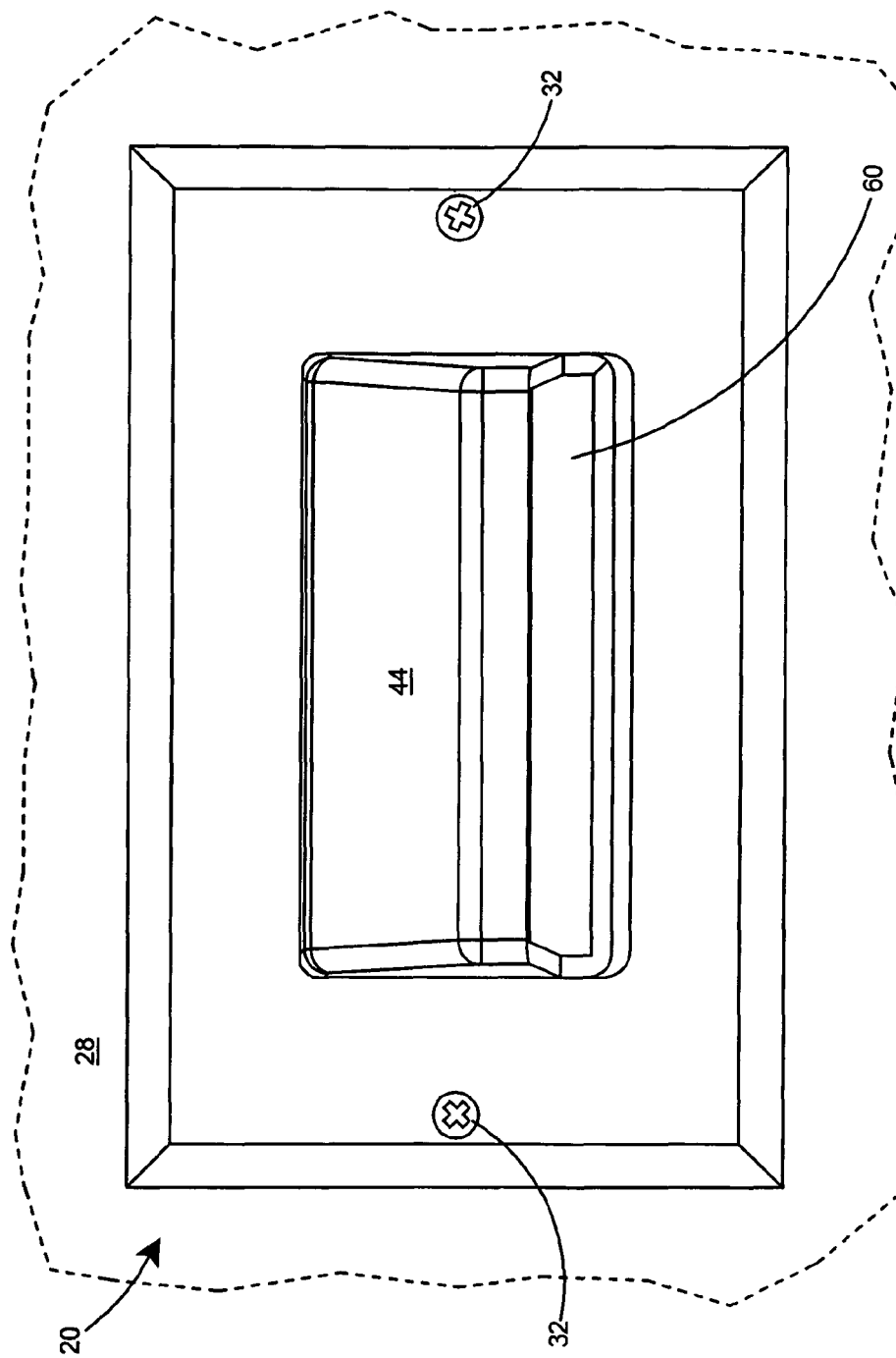
FIG. 9 is a front view of the reversible protective cable chute of FIG. 1 after being secured to an electrical box and installed on a wall.

With reference to FIG. 9 there is a front view of the reversible protective cable chute 20 after being secured to an electrical box and installed on a wall 28 with the nose portion 44 extending into the room. As shown in FIG. 9, the front opening provides a substantially wide open area 60.

Figure 10:
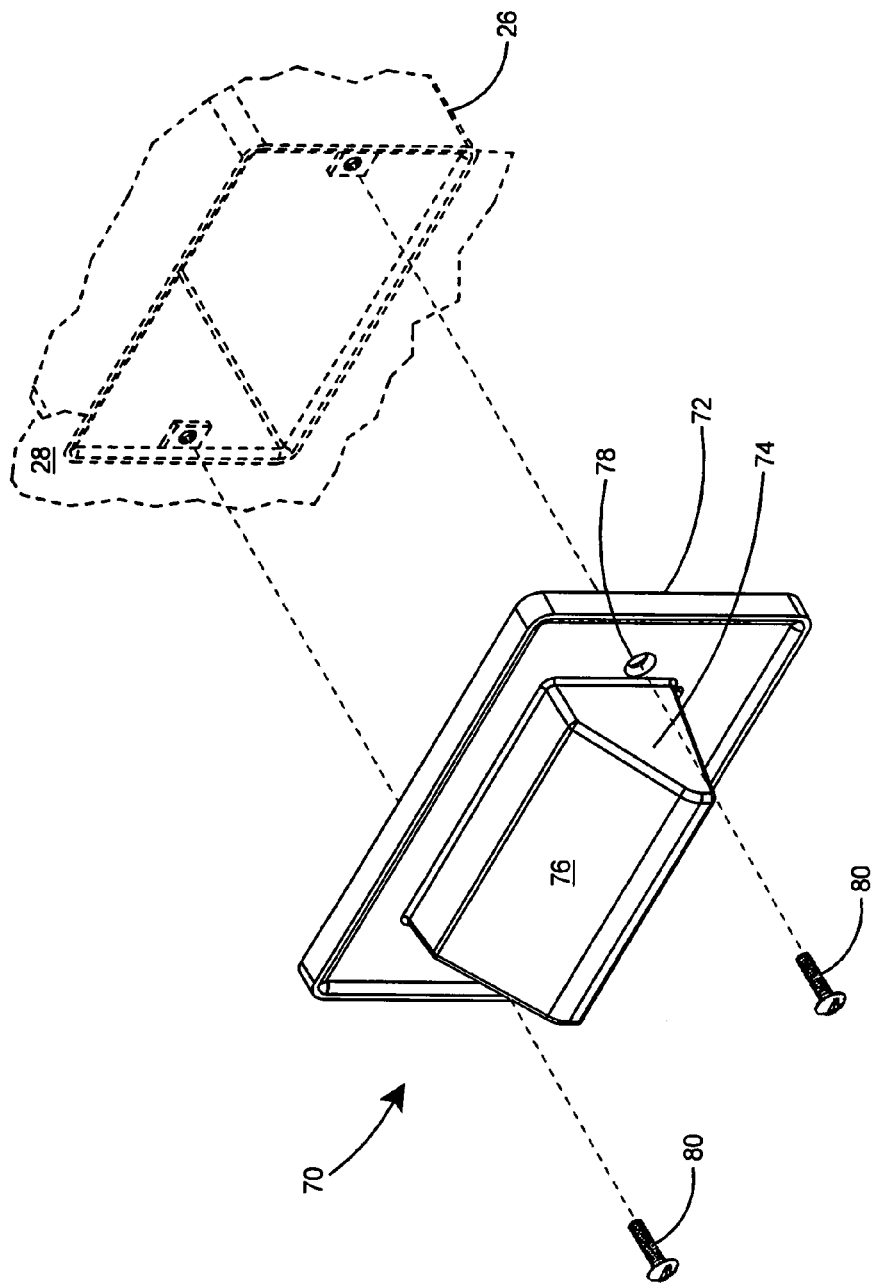
FIG. 10 is an exploded perspective view of a second embodiment of a reversible protective cable chute according to the present invention.

With reference to FIG. 10 there is shown a second and preferred embodiment of the reversible protective cable chute 70 according to the present invention. The reversible protective cable chute 70 is a one-piece device in which the cover plate 72 is integral with the cable shield 74. The cable shield 74 includes a nose portion 76 extending outward from the cover plate 72. The reversible chute 70 can be installed with the nose portion 76 extending outward from the electrical box 26 as shown in FIG. 10 or it can be reversed and secured to the box 26 with the nose portion 76 extending into the box 26. The one-piece cable chute 70 includes two-way apertures 78 for accepting fasteners 80 there through for securing the cable chute 70 to the electrical box 26.

Figure 11:
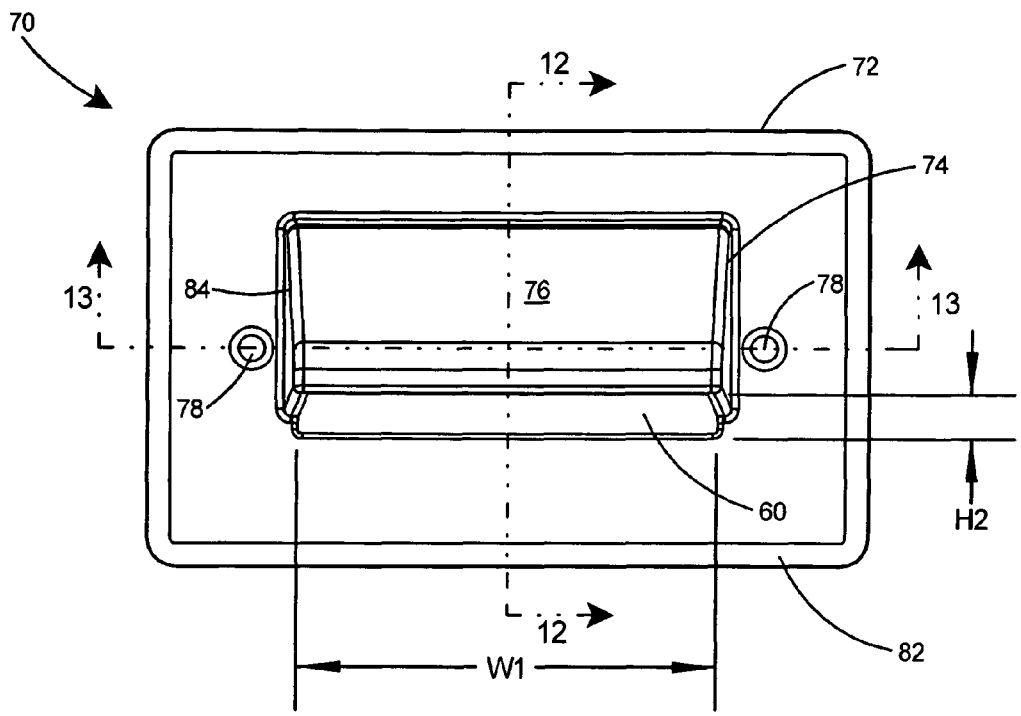
FIG. 11 is a front view of the reversible protective cable chute of FIG. 10.
Figure 12:
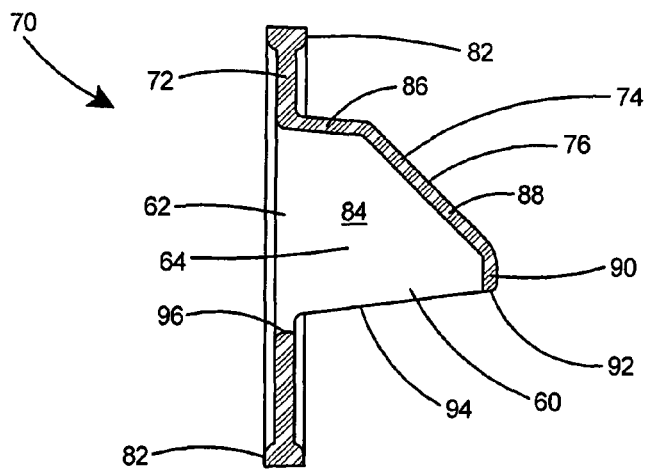
FIG. 12 is a sectional view of the reversible protective cable chute taken along line 12-12 of FIG. 11.

As shown in FIGS. 11 and 12, the one-piece reversible cable chute 70 includes a substantially wide and high open area 60 in the same manner as the first embodiment of the cable chute. As shown in FIG. 11, the open area 60 includes a substantial width W1 and height H2 in same manner as the first embodiment. Cover plate 72 is provided with a raised outer periphery 82.

As shown in FIG. 12, the cable shield 74 portion of the one-piece reversible cable chute 70 includes a side wall 84, top wall 86, outer wall 88, end wall 90, outer edge 92 at the lower tip of the end wall 90, and a side edge 94. The cover plate 72 opening includes a bottom edge 96 that will define the lower edge of the open area 60. The one-piece reversible cable chute 70 includes an open area 60, rear opening 62, and cable passageway 64 as shown.

Figure 13:
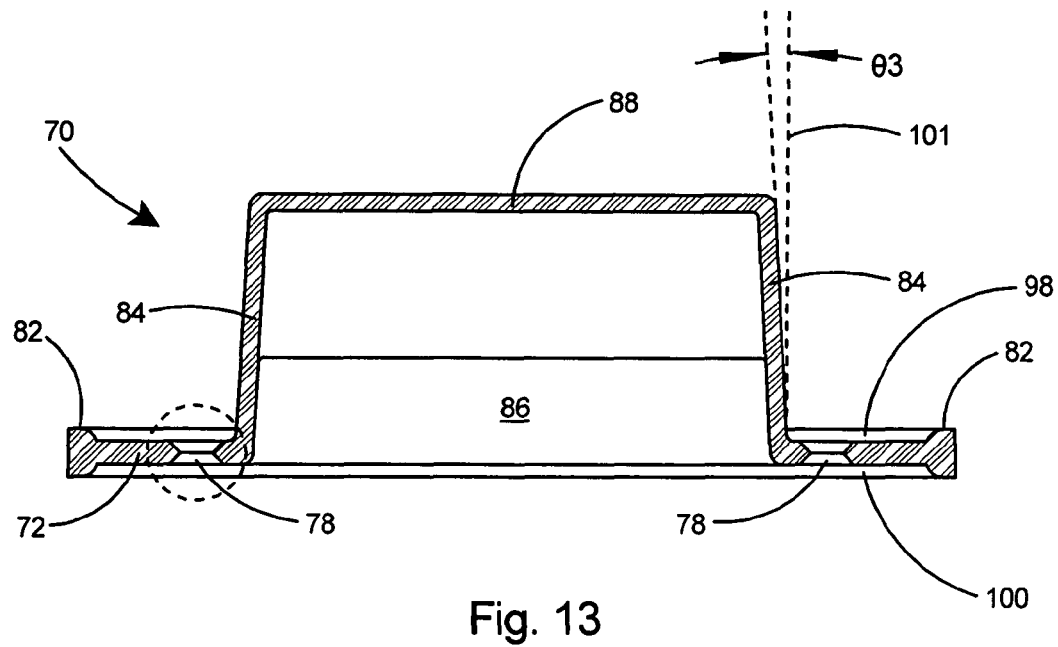
FIG. 13 is a sectional view of the reversible protective cable chute taken along line 13-13 of FIG. 11.
Figure 14:
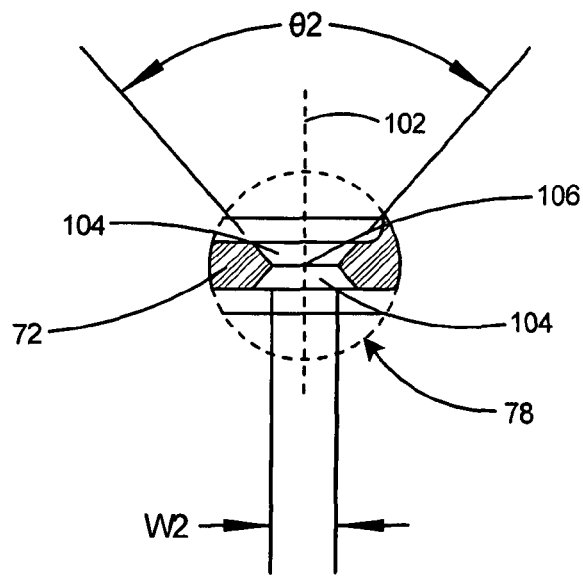
FIG. 14 is a detailed view of the two-way mounting aperture on the left side of the cable chute of FIG. 13.

The cover plate 72 portion of the one-piece reversible cable chute 70, as shown in FIG. 13, includes a front recessed area 98 and a rear recessed area 100. The front recessed area 98 extends between the outward extending cable shield 74 and the raised outer periphery 82 of the cover plate 72. Cover plate apertures 78 are provided in the cover plate 72 on either side of the side walls 84 of the cable shield 74. The side walls 84 of the cable shield 74 preferably slope inward slightly at an angle Θ3 with respect to an axis 101 perpendicular to the front surface of the cover plate 72. Preferably angle Θ3 is between 2 and 5 degrees. As shown in FIG. 14, cover plate two-way aperture 78 with axis 102 includes countersunk areas 104 on both sides of the cover plate 72. The countersunk areas 104 are critical to enable the one-piece cable chute 70 to be reversible with respect to any box or frame that is connected to while providing an attractive installation with the head of the fasteners (not shown) residing below the surface of the recessed areas 98 and 100 of the cover plate 72. Preferably the angle Θ2 of the countersunk areas 104 is between 75 and 85 degrees. The width W2 at the center 106 of the cover plate two-way aperture 78 is preferably no more than 0.02 inch greater than the outer thread diameter of the cover plate fastener (not shown) that will be passed there through. As the one-piece cable chute 70 is preferably molded in one piece of plastic, it is critical that width W2 not exceed the preferred stated dimension with respect to the fastener in order for the cover plate 72 at the center 106 of aperture 78 adequately hold the fastener.

Reference is made to FIGS. 15 and 16 for an explanation of the operation of the one-piece reversible cable chute 70 of the present invention. The reversible cable chute 70 is a device for providing an attractive attachment for an electrical box or low voltage frame for the purpose of passing low voltage wiring from one room into an adjacent room. The cable chute 70 may be secured to the box 26 with the cable shield 74 extending outward into the room as shown in FIG. 15 or it may be reversed and secured to the box 26 with the cable shield 74 extending into the electrical box 26 as shown in FIG. 16. In either case the reversible cable chute 70 provides a portal for passing low voltage cables between separate rooms in a building. For creating an installation with the nose portion 76 of the cable shield 74 extending outward into the room, the cable chute 70 is simply aligned with the rear surface 110 of the cable chute 70 facing the box and with the cover plate apertures 78 aligned with the bores 112 in the electrical box 26. Fasteners 108 are then driven through cover plate 72 and tightened into bores 112 to secure the reversible cable chute 70 to the electrical box 26. Since low voltage cables (not shown) will be passed through the cable chute 70, there is no requirement by the electrical code to seal the box or frame member.

Alternatively, the cable chute 70 may be installed with the nose portion 76 of the cable shield 74 extending into the box 26 as shown in FIG. 16. For creating an installation with the nose portion 76 of the cable shield 74 extending into the electrical box 26, the cable chute 70 is simply aligned with the front surface 114 of the cable chute 70 facing the box 26 and with the cover plate apertures 78 aligned with the bores 112 in the electrical box 26. Fasteners 108 are then driven through cover plate 72 and tightened into bores 112 to secure the reversible cable chute 70 to the electrical box 26. The countersunk areas 104, being provided on both the front surface 114 and rear surface 110 of the cover plate 72, enable the fasteners 108 in the final configuration to be recessed within the cover plate 72 regardless of whether the front surface 114 or rear surface 110 is facing outwards from the wall 28. Raised periphery 82 and recessed areas 98 and 100 on cover plate 72 enable the cover plate 72 to fit flush against wall 28, even if electrical box 26 juts slightly outward of the wall surface.

The protective cable chutes 20 and 70 of the present invention are preferably molded of plastic but could also be formed of metal. For the first embodiment of the reversible protective cable chute 20 shown in FIG. 1, the cable shield 22 is most preferably molded in one piece of plastic and the cover plate 24 is simply a conventional decorative electrical cover plate that is available in most hardware stores. For the second and preferred embodiment of the reversible protective cable chute 70, shown in FIGS. 15 and 16, the cable chute 70 is most preferably molded in one piece of plastic. The plastic used to form the cable shield 22 of cable chute 20 and the one-piece cable chute 70 is preferably polypropylene, polyethylene, polyvinyl chloride (PVC), acrylonitrile-butadiene styrene (ABS), or polycarbonate.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A reversible protective cable chute for use with an electrical box comprising:
    a cable shield for direct mounting to said electrical box, said cable shield capable of reversible mounting with respect to said electrical box;
    said cable shield including a base portion having an opening therein, two ends, and an ear extending from each of said ends;
    said ears of said base portion including an outer bore and an inner bore therein;
    a nose portion extending outward from the periphery of said opening of said base portion;
    a cover plate including two-way apertures therein for direct mounting to said cable shield;
    said inner bores of said base portion adapted for acceptance of fasteners for securing said cable shield directly to said electrical box; and
    said outer bores of said base portion adapted for acceptance of fasteners for securing said cover plate directly to said cable shield.

2. The reversible protective cable chute of claim 1 wherein said two-way apertures include countersunk areas on both ends of said apertures.

3. The reversible protective cable chute of claim 1 wherein said nose portion of said cable shield includes a top wall and sidewalls extending from said cable shield and an outer wall extending from said top wall and sidewalls.

4. The reversible protective cable chute of claim 3 wherein said cable shield includes a planar outer edge on said outer wall and a planar side edge at the lower end of said sidewalls.

5. The reversible protective cable chute of claim 1 wherein said nose portion includes a nose portion opening therein; and
    said nose portion opening is rectangular-shaped.

6. The reversible protective cable chute of claim 1 wherein said cable shield includes a peripheral collar extending outward from said base portion in an opposite direction of said nose portion.

7. The reversible protective cable chute of claim 1 wherein said cable shield may be mounted to said electrical box in a first orientation or a second orientation;
    said first orientation includes said nose portion extending away from said electrical box; and
    said second orientation includes said nose portion extending into said electrical box.

8. The reversible protective cable chute of claim 1 wherein said cable shield is molded in one piece of plastic.

9. The reversible protective cable chute of claim 8 wherein said plastic is selected from the group including polypropylene, polyethylene, polyvinyl chloride, acrylonitrile-butadiene styrene, and polycarbonate.

10. A reversible protective cable chute for use with an electrical box having an open front comprising:
    a one-piece cable shield including an integral cover plate, for direct mounting to said open front of said electrical box;
    an opening in said cover plate;
    a nose portion extending outward from the periphery of said opening in said cover plate;
    a raised outer periphery extending around the outer edge of said cover plate, said raised outer periphery defining a front recessed area and a rear recessed area on said cover plate; and
    said cover plate including two-way apertures therein for acceptance of fasteners for mounting said cable chute directly to said open front of said electrical box, said two-way apertures including countersunk areas on both sides of said cover plate;
    said two-way apertures enabling mounting of said cable chute to said electrical box in a first orientation or a second orientation, said first orientation including said nose portion extending away from said electrical box, and said second orientation including said nose portion extending into said electrical box; and
    an open area visible from directly in front of said cable chute and said electrical box, said open area visible in said first orientation and in said second orientation of said cable chute with respect to said electrical box.

* * * * *